(12) United States Patent
Kershteyn et al.

(10) Patent No.: US 7,733,193 B2
(45) Date of Patent: Jun. 8, 2010

(54) SYSTEMS AND METHODS FOR DQPSK MODULATOR CONTROL USING SELECTIVELY INSERTED DITHER TONE

(75) Inventors: Boris Kershteyn, Marietta, GA (US); Steven W. Cornelius, Dunwoody, GA (US)

(73) Assignee: Ciena Corporation, Linthicum, MD (US)

( * ) Notice: Subject to any disclaimer, the term of this patent is extended or adjusted under 35 U.S.C. 154(b) by 454 days.

(21) Appl. No.: 11/933,777

(22) Filed: Nov. 1, 2007

(65) Prior Publication Data

US 2009/0115544 A1   May 7, 2009

(51) Int. Cl.
*G02F 1/01* (2006.01)
*H04B 10/04* (2006.01)
*H04L 27/20* (2006.01)

(52) U.S. Cl. .................. 332/103; 359/239; 359/279; 398/198

(58) Field of Classification Search ......... 332/103–105; 359/238–240, 245, 279; 398/182, 198
See application file for complete search history.

(56) References Cited

U.S. PATENT DOCUMENTS

2004/0005154 A1* 1/2004 MacDonald ................ 398/198

\* cited by examiner

*Primary Examiner*—David Mis
(74) *Attorney, Agent, or Firm*—Clements Bernard PLLC; Christopher L. Bernard; Tyler S. Brown

(57) ABSTRACT

DQPSK modulator control is provided using a single monitor photodiode with a selectively injected dither tone. The dither tone signal is sequentially injected into arm modulators and/or to a modulator driver port in time slots. A tapped signal at the output of the modulator is monitored synchronously with injected dither (I arm, Q arm, or phase modulator in third slot). The recovered dither output from a single photodiode is processed in the same sequence as the dither injection to adjust the bias to the optimal point: I-arm at the null point, Q-arm at the null point, and phase modulator at the quadrature point. This technique can be used for any control where the rate of change of the monitored condition due to systemic or environmental conditions (e.g., temperature, aging, etc.) is slow enough to allow time slot dither injection, monitor, and control.

18 Claims, 5 Drawing Sheets

US 7,733,193 B2

SYSTEMS AND METHODS FOR DQPSK MODULATOR CONTROL USING SELECTIVELY INSERTED DITHER TONE

FIELD OF THE INVENTION

The present invention relates generally to modulators for fiber optic communications, and more specifically, the present invention relates to systems and methods for Differential Quadrature Phase Shift Keying (DQPSK) modulator control using selectively inserted dither tones and a single monitor photodiode.

BACKGROUND OF THE INVENTION

Differential Quadrature Phase Shift Keying (DQPSK) transmission has emerged as an efficient modulation scheme for high-data rate optical transmission. DQPSK is a four-level version of Differential Phase Shift Keying (DPSK). DQPSK modulation transmits two bits for every symbol (bit combinations being 00, 01, 11 and 10). DQPSK has a narrower optical spectrum than DPSK, and tolerates more dispersion (both chromatic and polarization-mode), allows for stronger optical filtering, and enables closer channel spacing. For example, DQPSK allows processing of 40 Gbps data-rate in a 50 GHz channel spacing system. Additionally, a 112 Gbps signal can be transmitted using polarization multiplexing and DQPSK modulation at a 28 GBaud signal, correspondingly requiring electronic and optical components that need to support only a 28 Gbps bit rate. Advantageously, this allows for high-rate signal transmission exceeding the limitations of conventional direct binary modulation schemes.

Generally, a DQPSK modulator includes a combination of three modulator sections. These sections include an I-arm modulator for an in-phase data signal, a Q-arm modulator for a quadrature data signal, and a main modulator which is referred to as a phase modulator. The I-arm and Q-arm modulators are driven by independent data streams, and each of the modulators modulates different phases. For example, one modulator can perform modulation at 0 degrees and 180 degrees, and the other one can perform modulation at 90 degrees and 270 degrees (i.e., each modulator is always 180 degrees apart). DQPSK modulators can be built through discreet components (i.e., "stick built") or as a single integrated unit.

The DQPSK modulator has three bias ports that need to be controlled for an optimal output including the I-arm and Q-arm modulators and the phase modulator. Bias is a DC voltage applied to the port. For example, the I-arm and Q-arm modulators are usually set for null point, and the phase modulator is set for quadrature point. Control is required of these three bias ports to compensate for environmental and/or systemic changes.

Conventional bias control mechanisms utilize dither tones which can be injected into arm modulators bias ports and/or modulator drivers. The state of this dither is subsequently monitored at the optical signal output of the modulator through an optical splitter with a tap feeding a photodiode. Disadvantageously, these conventional bias control mechanisms require multiple dither tones and multiple monitoring photodiodes. For example, to process these dither tone signals at the output of the modulator with the multiple monitoring photodiodes adds complexity related to fiber splicing, board space, and control. Each photodiode requires its own hardware and software to process dither signals.

BRIEF SUMMARY OF THE INVENTION

In various exemplary embodiments, the present invention provides systems and methods for DQPSK modulator control using a single monitor photodiode with a selectively injected dither tone. The dither tone signal is sequentially injected into arm modulators and/or to modulator driver ports in time slots. The tapped signal at the output of the modulator is monitored synchronously with injected dither (I arm, Q arm, or phase modulator in third slot). The recovered dither output from a single photodiode is processed in the same sequence as the dither injection to adjust the bias to the optimal point: I-arm at the null point, Q-arm at the null point, and phase modulator at the quadrature point. Advantageously, the single monitor photodiode is included as an internal part in some DQPSK modulator configurations.

In an exemplary embodiment of the present invention, a differential quadrature phase shift keying (DQPSK) modulation system includes a DQPSK modulator including an I-arm modulator, a Q-arm modulator, a phase modulator, and a splitter at an output of the DQPSK modulator, a photo-detector connected to the splitter, and a monitor and control circuit connected to the photo-detector, wherein the monitor and control circuit is configured to selectively insert a dither tone and control bias on each of the I-arm modulator, the Q-arm modulator, and the phase modulator, and the bias control is responsive to monitoring the photo-detector. Optionally, the monitor and control circuit includes a dither clock configured to generate a dither tone signal, and the dither clock is configured to selectively insert the dither tone signal at different predetermined times into each of the I-arm modulator, the Q-arm modulator, and the phase modulator. Alternatively, the monitor and control circuit includes a microprocessor, and the microprocessor is configured to receive measurements of an output signal from the DQPSK modulator, calculate an error between the measurements and a target value, and adjust bias on one of the I-arm modulator, the Q-arm modulator, and the phase modulator responsive to the error. Optionally, the dither clock is connected to a multi-port switch/selector connected to both the I-arm modulator and the Q-arm modulator, and the multi-port switch/selector is configured to selectively connect the dither clock separately to each of the I-arm modulator and the Q-arm modulator for a pre-determined time period.

The bias adjustment is done on one of the I-arm modulator, the Q-arm modulator, and the phase modulator corresponding to the setting of the multi-port switch/selector. Optionally, the monitor and control circuit further includes an amplifier connected to the photo-detector, an analog-to-digital converter connected to the amplifier, and the microprocessor connected to the analog-to-digital converter, a first digital-to-analog converter, a second digital-to-analog converter, and a third digital-to-analog converter. The first digital-to-analog converter connects to the I-arm modulator, the second digital-to-analog converter connects to the Q-arm modulator, and the third digital-to-analog converter connects to the phase modulator. The microprocessor is configured to adjust bias by changing values provided to each of the first digital-to-analog converter, the second digital-to-analog converter, and the third digital-to-analog converter. Alternatively, the dither clock is connected to a multi-port switch/selector connected to a driver connect to the I-arm modulator and a driver connected to the Q-arm modulator, and the multi-port switch/selector is configured to selectively connect the dither clock separately to each of the I-arm modulator and the Q-arm modulator for a pre-determined time period. The monitor and control circuit is configured to sequentially adjust bias on each of the I-arm modulator, the Q-arm modulator, and the phase modulator utilizing a single dither tone signal selectively inserted into each of the I-arm modulator, the Q-arm modulator, and the phase modulator at different times slots and adjusting bias based on which time slot is currently monitored at the photo-detector. Optionally, bias on the I-arm modulator and the Q-arm modulator is set for null point and bias on the phase modulator is set for quadrature point.

In another exemplary embodiment of the present invention, a modulator bias control method includes selectively inserting a dither tone signal into one of an I-arm modulator, a Q-arm modulator, and a phase modulator, wherein the I-arm modulator, the Q-arm modulator, and the phase modulator include a DQPSK modulator, and the dither tone is selectively inserted into each of the I-arm modulator, the Q-arm modulator, and the phase modulator for separate pre-determined time periods, monitoring the dither tone at an output of the DQPSK modulator with a single photo-detector, and adjusting bias on one of the I-arm modulator, the Q-arm modulator, and the phase modulator responsive to monitored error, wherein the bias is adjusted depending on which of the I-arm modulator, the Q-arm modulator, and the phase modulator is receiving the dither tone signal. Optionally, at start-up, the selectively inserting, monitoring, and adjusting steps are performed for each of the I-arm modulator, the Q-arm modulator, and the phase modulator to provide proper bias settings, and, subsequently, the selectively inserting, monitoring, and adjusting steps are performed for continuing correction. Alternatively, the dither tone signal is generated by a dither clock connected to each of the I-arm modulator, the Q-arm modulator, and the phase modulator, and the dither clock is configured to insert the dither tone signal separately into each of the I-arm modulator, the Q-arm modulator, and the phase modulator for the separate pre-determined time periods. Optionally, bias on the I-arm modulator and the Q-arm modulator is set for null point and bias on the phase modulator is set for quadrature point. Alternatively, the adjusting bias step is performed only if the monitored error exceeds a threshold. The modulator bias control method is configured to sequentially adjust bias on each of the I-arm modulator, the Q-arm modulator, and the phase modulator utilizing a single dither tone signal selectively inserted into each of the I-arm modulator, the Q-arm modulator, and the phase modulator at different times slots and adjusting bias based on which time slot is currently monitored at the photo-detector.

In yet another exemplary embodiment of the present invention, an adjustment system for a modulator include a dither tone signal generation system configured to generate a dither tone signal, means for selectively inserting the dither tone signal into one of a plurality of modulators for a set time period, a monitoring photo-detector at an output of the modulator, and an error correction system configured to adjust bias on one of the plurality of modulators responsive to monitoring the dither tone signal at the output of the modulator. Optionally, the modulator includes a DQPSK modulator, and the plurality of modulators include an I-arm modulator, a Q-arm modulator, and a phase modulator. The error correction system is configured to sequentially adjust bias on each of the plurality of modulators utilizing a single dither tone signal selectively inserted into each of the plurality of modulators utilizing at different times slots and adjusting bias based on which time slot is currently monitored at the photo-detector.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for DQPSK modulator control using a single monitor photodiode with a selectively injected dither tone. The dither tone signal is sequentially injected into arm modulators and/or to modulator driver ports in time slots. The tapped signal at the output of the modulator is monitored synchronously with injected dither (I arm, Q arm, or phase modulator in third slot). The recovered dither output from a single photodiode is processed in the same sequence as the dither injection to adjust the bias to the optimal point: I-arm at the null point, Q-arm at the null point, and phase modulator at the quadrature point. Advantageously, the single monitor photodiode is included as an internal part in some DQPSK modulator configurations. This technique can be used for any control where the rate of change of the monitored condition due to systemic or environmental conditions (e.g., temperature, aging, etc.) is slow enough to allow time slot dither injection, monitor, and control.

Figure 1:
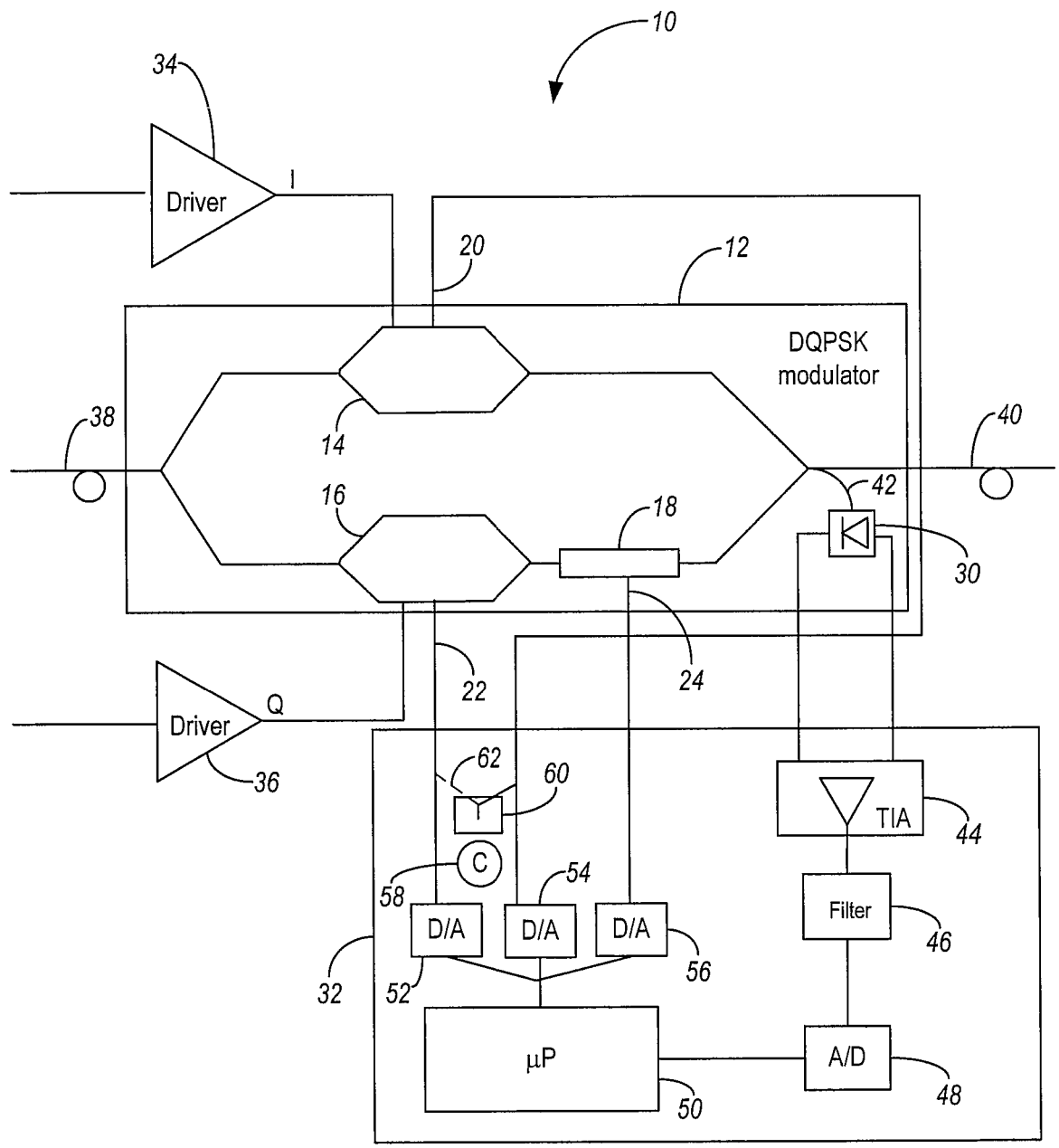
FIG. 1 is block diagram of a DQPSK modulation system according to an exemplary embodiment of the present invention.

Referring to FIG. 1, a DQPSK modulation system 10 is illustrated according to an exemplary embodiment of the present invention. A DQPSK modulator 12 is made of a combination of three modulator sections including an I-arm modulator 14 for an in-phase data signal, a Q-arm modulator 16 for a quadrature data signal, and a main phase modulator 18. This configuration can be built discreetly, or integrated in a single unit. As described herein, the DQPSK modulator 12 has three bias ports 20,22,24 that need to be controlled for the optimal output. The bias ports 20,22,24 include I-arm modulator bias port 20, Q-arm modulator bias port 22, and phase modulator bias port 24. Typically, the I-arm and Q-arm bias ports 20,22 are set for null point, and the phase modulator bias port 18 is set for quadrature point.

Advantageously, the present invention utilizes a single photodiode 30 and control circuit 32 to control all three bias ports 20,22,24. This eliminates the need for more than one photodiode for monitoring and control. The present invention utilizes a variable time slot injection of a dither signal into the I-arm and Q-arm bias ports 20,22 and the phase modulator bias port 24. The control circuit 32 is configured to monitor and dynamically control the three bias ports 20,22,24 based on the respective dither signal in the variable time slot. For example, I-arm modulator 14 monitor and control is provided during a first time slot, Q-arm modulator 16 monitor and control is provided during a second time slot, and phase modulator 18 monitor and control is provided during a third time slot (note, the third time slot could use I-arm or Q-arm injected dither or dither injected through modulator drivers 34,36).

The modulator drivers 34,36 are configured to provide I and Q data streams to the I-arm and Q-arm modulators 14,16, respectively. For example, the I and Q data streams can include data pre-coded for DQPSK modulation. The modulator 10 includes an input 38 which can receive a laser, such as a distributed feedback laser. The I and Q data signals are combined in the phase modulator 18 in a proper phase relationship. The modulator 10 also includes an output 40 where the laser from the input 38 is phase modulated responsive to the I and Q streams and the modulators 14,16,18. At the output, the modulator 10 includes a splitter 42 which is configured to route a small portion of the output signal to the monitor photodiode 30.

The photodiode 30 is connected to a trans-impedance amplifier (TIA) 44. The TIA 44 is a current-to-voltage converter circuit that performs amplification and current to voltage transformation. A filter 46 is connected to the amplifier 44 and configured to recover the injected dither signal. An analog-to-digital converter (ADC) 48 is configured to process the output of the filter 46 and convert it to a digital value for a microprocessor 50. Alternatively, the filter 46 could be a software process within the microprocessor 50 removing the need for an external device. The microprocessor 50 is configured to process the information (i.e., the digital value of the dither signal) and supply a signal to three digital-to-analog converters (DAC) 52,54,56. The microprocessor 50 implements a control algorithm to control the bias ports 20,22,24 responsive to dither signal value and time slot. The DAC 52 controls the Q-arm bias port 22, the DAC 54 controls the I-arm bias port 20, and the DAC 56 controls the phase modulator bias port 24.

The microprocessor 50 is a hardware device for executing software instructions. The microprocessor 50 can be any custom made or commercially available processor, a central processing unit (CPU), an auxiliary processor among several processors associated with the control circuit 32, a semiconductor-based microprocessor (in the form of a microchip or chip set), or generally any device for executing software instructions. When the control circuit 32 is in operation, the microprocessor 50 is configured to execute software stored within memory, to communicate data to and from the memory, and to generally control operations of the control circuit 32 pursuant to the software instructions.

The microprocessor 50 includes input/output (I/O) interfaces to/from the filter 46, ADC 48, and DACs 52,54,56. The I/O interfaces are configured to receive input from and/or for providing system output to one or more devices or components. The microprocessor 50 further includes memory which can be any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the microprocessor 50. The memory is utilized to store software instructions and data and flags needed to operate the dither control algorithm described herein.

Figure 4:
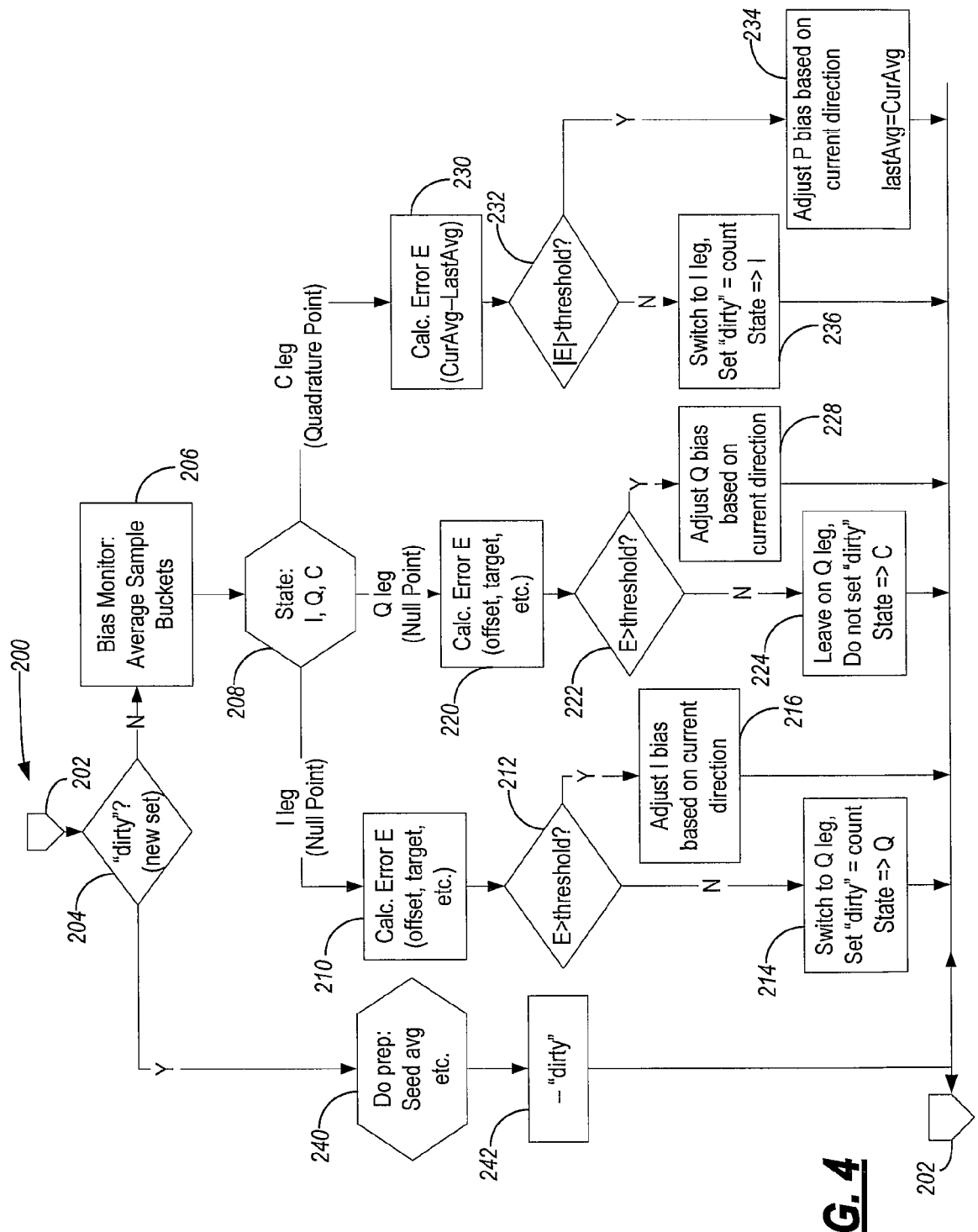
FIG. 4 is a flowchart illustrating a DQPSK modulator bias control algorithm according to an exemplary embodiment of the present invention.

In an exemplary embodiment of the present invention, the microprocessor 50 includes software programs in the memory, each of which includes an ordered listing of executable instructions for implementing logical functions. For example, the algorithm 200 described herein in FIG. 4 provides an exemplary control mechanism of the present invention. This can be stored as a program in the memory. Further, the memory includes a suitable operating system for general operations of the microprocessor 50.

A dither clock 58 is connected to a multi-port switch/selector 60 to supply the dither signal to the I-arm and Q-arm modulators 14,16 through the same bias ports 20,22 which the DACs 52,54 provide a DC bias to. Note, the dither signal for time slots associated with the phase modulator 18 can be provided through either modulator 14,16. Additionally, in another exemplary embodiment, the multi-port switch/selector 60 can additionally supply dither through the drivers 34,36. Alternatively, the dither tone could be realized in the microprocessor 50 thus eliminating the need for the dither clock 58 and switch 62. This dither from microprocessor 50 can modulate DC bias output in the same manner as the separate dither clock 58 and switch 62.

Figure 2:
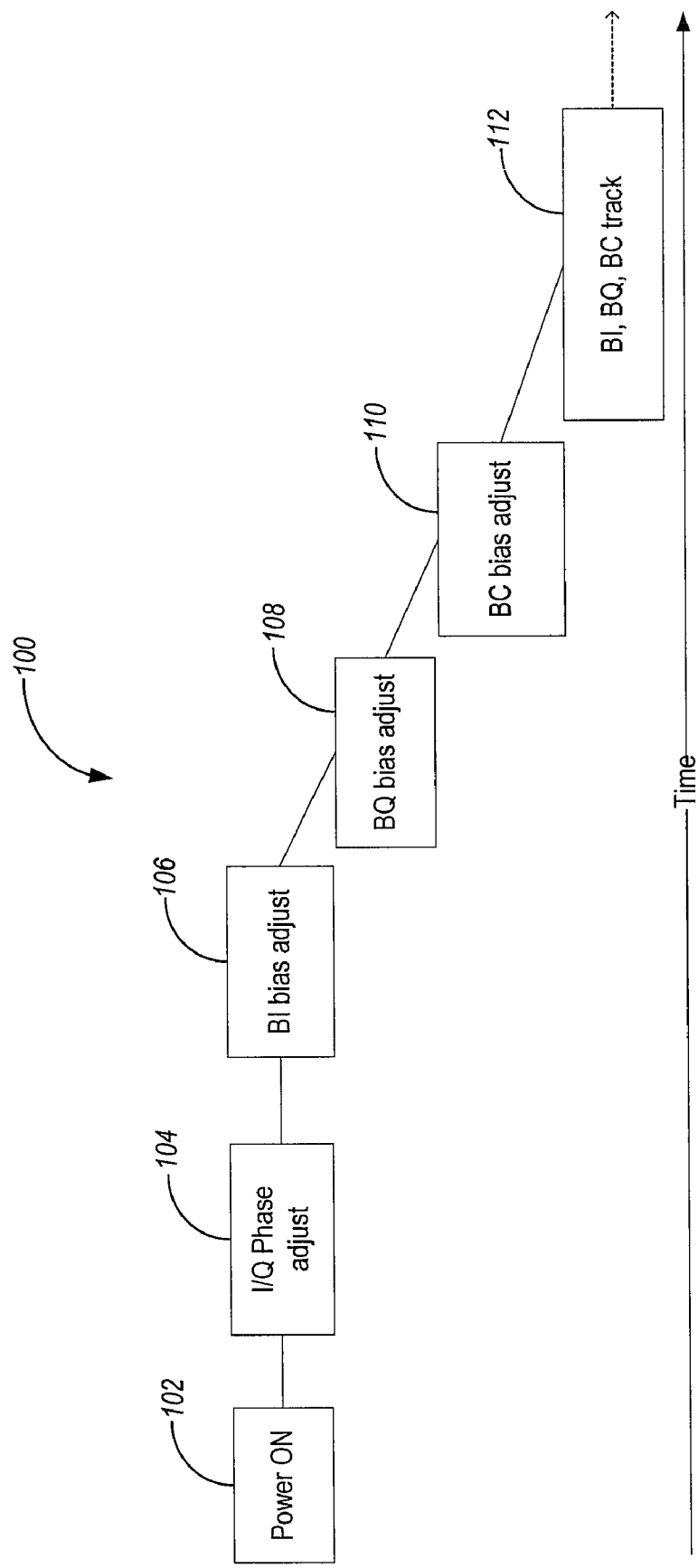
FIG. 2 is a timing diagram illustrating time slots for an exemplary embodiment of the present invention.

Referring to FIG. 2, a timing diagram illustrates time slots 100 for an exemplary embodiment of the present invention. First, the system is powered on (step 102). The DQPSK modulation system provides a phase adjustment to align the I and Q data streams (step 104). In this exemplary embodiment, the time slots 100 are set such that the I-arm modulator bias port is first (step 106), then the Q-arm modulator bias port (step 108), and then the phase modulator bias port (step 110).

In step 106, the dither tone signal is supplied to the I-arm, such as through the I-arm driver or directly through the I-arm modulator. The photo-detector and control circuit monitor the state of the in-phase signal, and adjust a DC bias of the I-arm modulator accordingly, such as to null point. The same procedure is followed in step 108 with regard to the Q-arm modulator. Here, the dither tone signal is supplied instead to the Q-arm modulator, such as through a switch/selector, and the control circuit performs a similar adjustment here. For step 110, the dither tone signal for the phase modulator is contained in dither injected through the drivers or through the Q arm.

The time slots 100 do not have to be contiguous, symmetrical, or sequential. Instead, the control circuit is configured to correlate the injected dither signal with the appropriate bias control port in order to process and control the bias. The present invention further contemplates using a single photo-detector for any process whose state can be determined in this manner. For example, these mechanisms could be utilized to control phase alignments between I and Q channels and control phase alignments with regard to a carver modulator.

Figure 3:
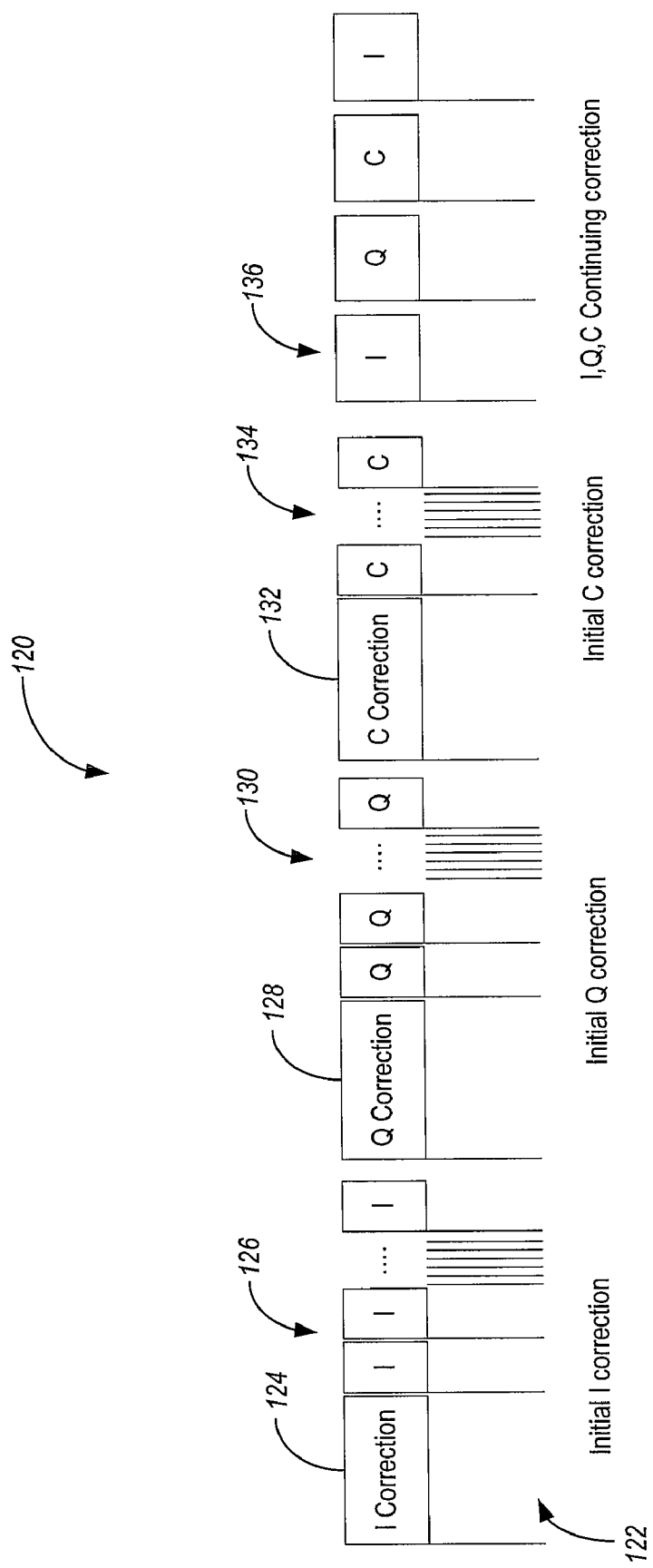
FIG. 3 is a modulator bias correction state diagram illustrating system states and sampling for startup and for one possible run sequence, according to an exemplary embodiment of the present invention.

Referring to FIG. 3, a modulator bias correction state diagram 120 illustrates system states and sampling for startup and for one possible run sequence, according to an exemplary embodiment of the present invention. Dither injection is illustrated at point 122. In this example, I-arm correction 124 is shown first. The dither tone is injected into the I-arm modulator and a control circuit measures bias error based on the dither tone. After the correction 124, several measurements 126 are continued for the I-arm to ensure proper bias control. Next, the dither tone is injected into the Q-arm modulator for Q-arm correction 128 and the control circuit measures bias error based on the dither tone. After the correction 128, several measurements 130 are continued for the Q-arm to ensure proper bias control. Third, the dither tone is injected into the Q-arm or I-arm modulator for phase modulator correction 132 and the control circuit measures bias error based on the dither tone. After the correction 132, several measurements 134 are continued for the phase modulator to ensure proper bias control. Finally, the diagram 120 performs a tracking function 136 providing continual correction of each of the bias ports by alternating the dither tone injection and monitoring over time.

Referring to FIG. 4, a flowchart illustrates a DQPSK modulator bias control algorithm 200 according to an exemplary embodiment of the present invention. The modulator bias control algorithm 200 can be implemented with the DQPSK modulation system 10 of FIG. 1 with the microprocessor 50 and other components. Generally, the modulator bias control algorithm 200 is configured to utilize a single photo-detector with a selectively inserted dither tone to monitor and control bias of an I-arm, Q-arm, and phase modulator in a DQPSK modulation system.

The algorithm 200 is configured to repeat, and it begins at step 202. First, the algorithm 200 determines if the bias control is "dirty" requiring a new set of DC bias settings (step 204). A setting of dirty is a flag set during a repetition through the algorithm 200. If not, a bias monitor collects and averages a bucket of samples (step 206). The bucket of samples can include a set of measured dither tone signal values from a single photo-detector, such as illustrated in FIG. 1. The algorithm 200 can utilize an average sample to improve control performance and prevent large variations in bias control values.

Next, the algorithm 200 checks the state, I for I-arm control, Q for Q-arm control, or C for phase control (step 208). The state corresponds to the time slots described herein, and is a settable flag set to one of I, Q, and C. For example, if the state is I, then the dither tone signal is being injected into the I-arm modulator, and the photo-detector is measuring I-arm modulator bias error. The algorithm 200 can be configured to perform a continuous loop and each iteration can be for a different bias port, i.e. I, Q, or C. Advantageously, the same dither signal and photo-detector are utilized for bias control by performing a time-slice through the use of different time slots for each bias port.

Figure 5:
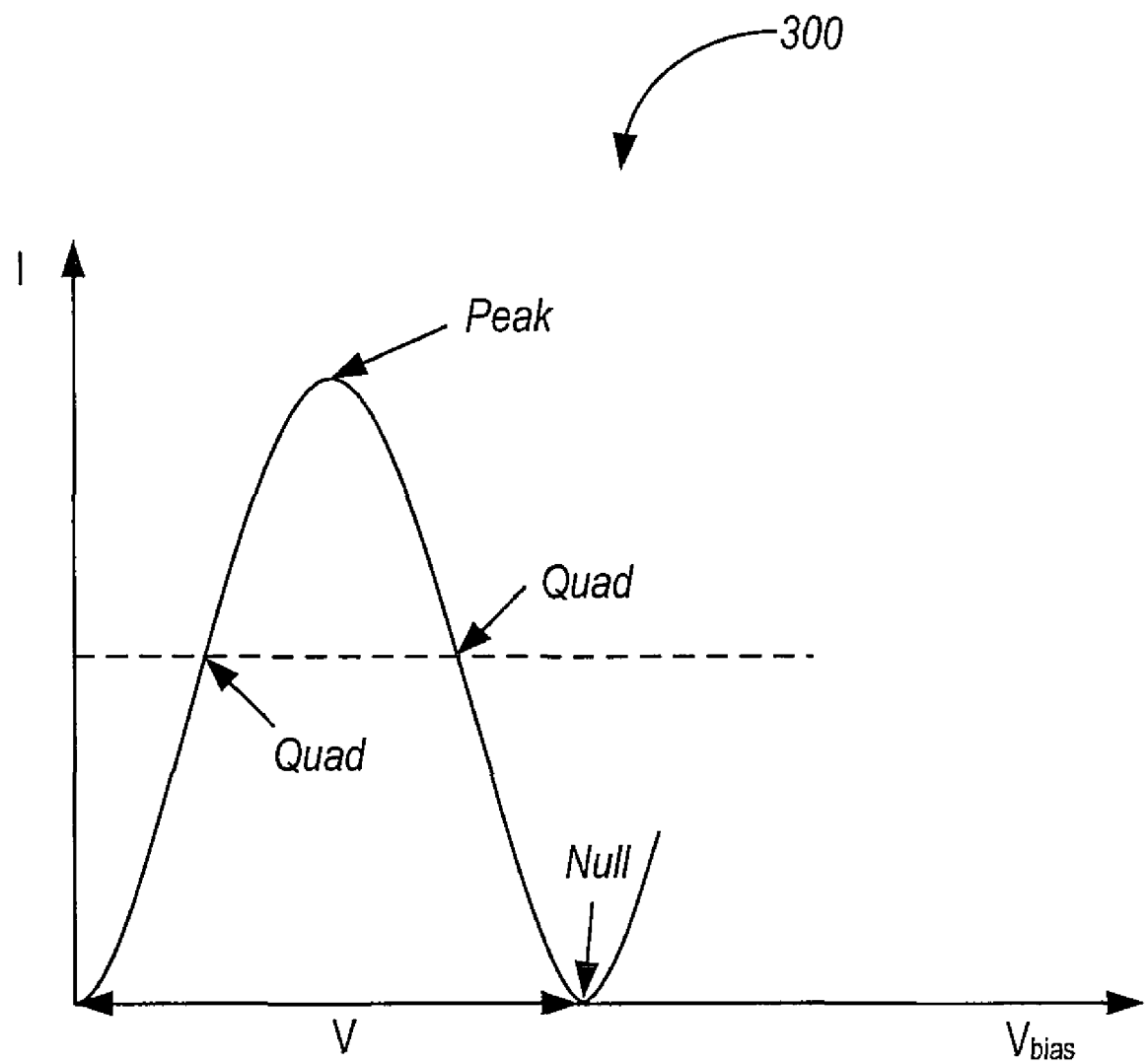
FIG. 5 is a graph illustrating bias control for a Mach-Zehnder modulator configured for DQPSK modulation according to an exemplary embodiment of the present invention.

If the state flag is I (step 208), the I-leg bias is monitored and controlled to set it to, for example, null point. The algorithm 200 calculates an error value based on monitoring the dither tone signal at an output of the DQPSK modulator (step 210). The error value can be based on a difference from a target value, an offset value, and the like. The calculated error is compared to an error threshold (step 212). Referring to FIG. 5, a graph 300 illustrates bias control for a Mach-Zehnder modulator configured for DQPSK modulation according to an exemplary embodiment of the present invention. As described herein, the I-arm and Q-arm modulators can be set to a null setting and the phase modulator to a quadrature setting. Here, the error value determines how much the bias port needs to be adjusted to position based on measured current.

Referring back to FIG. 4, if the error value is greater than the threshold (step 212), then the I-arm bias is adjusted based on the detected current (step 216). For example, the microprocessor 50 in the modulation system 10 of FIG. 1 can be configured to output a new voltage value on the DAC 54 responsive to the error signal (which is based on the detected current through the photo-detector 30 and amplifier 42). Following the adjustment, the state flag remains set to I, and the algorithm 200 returns to step 202. Here, the algorithm 200 repeats the I-arm control to ensure the adjustment led to a correction below the error threshold.

If the error value is less than the threshold (step 212), then the algorithm 200 switches a multi-port switch/selector, such as switch/selector 60 in FIG. 1, to the Q-arm, sets the dirty flag equal to a count, and sets the state flag equal to Q (step 214).

The multi-port switch/selector is configured to determine which arm, I or Q, is connected to a dither tone generator. In this exemplary embodiment, initially, the multi-port switch/selector is set to the I-arm, and it is moved to the Q-arm when the state changes to Q from I. Additionally, the multi-port switch/selector remains on the Q-arm when monitoring and controlling the phase modulator bias. Note, those of ordinary skill in the art will recognize these selections can be alternated.

The dirty flag provides a loop control mechanism. The algorithm 200 utilizes the dirty flag through each iteration to determine if preparation is required, such as seeding the average, determining the number of samples, and the like. Setting the dirty flag to count causes the algorithm 200 to provide preparation in the next iteration. Setting the state flag to Q indicates that the I-arm bias has been modified and is within threshold values such that in the next iteration, the algorithm 200 monitors and controls the Q-arm.

If the state flag is Q (step 208), the Q-leg bias is monitored and controlled to set it to, for example, null point. The algorithm 200 calculates an error value based on monitoring the dither tone signal at the output of the DQPSK modulator (step 220). The error value can be based on a difference from a target value, an offset value, and the like. The calculated error is compared to an error threshold (step 222). If the error value is greater than the threshold (step 222), then the Q-arm bias is adjusted based on the detected current (step 228). For example, the microprocessor 50 in the modulation system 10 of FIG. 1 can be configured to output a new voltage value on the DAC 52 responsive to the error signal (which is based on the detected current through the photo-detector 30 and amplifier 42). Following the adjustment, the state flag remains set to Q, and the algorithm 200 returns to step 202. Here, the algorithm 200 repeats the Q-arm control to ensure the adjustment led to a correction below the error threshold.

If the error value is less than the threshold (step 222), then the algorithm 200 leaves the multi-port switch/selector, such as switch/selector 60 in FIG. 1, on the Q-arm, does not set the dirty flag equal to a count, and sets the state flag equal to C (step 224). The algorithm 200 sets the state flag to C and leaving the multi-port switch/selector on the Q-arm for the next iteration which provides monitor and control of the phase modulator.

If the state flag is C (step 208), the C-leg bias is monitored and controlled to set it to, for example, quadrature point. The C-leg bias represents the bias of the phase modulator. The algorithm 200 calculates an error value based on monitoring the dither tone signal at the output of the DQPSK modulator (step 230). The error value can be based on a difference from a current value and a last value. For example, the dirty flag is utilized to seed the last average value, and the algorithm 200 can compare this last value with the current value to determine error.

The absolute value of the calculated error is compared to an error threshold (step 232). If the error value is greater than the threshold (step 232), then the phase modulator bias is adjusted based on the detected current direction and the last average is set equal to the current average (for the following iterations) (step 234). For example, the microprocessor 50 in the modulation system 10 of FIG. 1 can be configured to output a new voltage value on the DAC 56 responsive to the error signal (which is based on the detected current through the photo-detector 30 and amplifier 42). Following the adjustment, the state flag remains set to C, and the algorithm 200 returns to step 202. Here, the algorithm 200 repeats the phase modulator control to ensure the adjustment led to a correction below the error threshold.

If the error value is less than the threshold (step 232), then the algorithm 200 switches the multi-port switch/selector, such as switch/selector 60 in FIG. 1, to the I-arm, sets the dirty flag equal to a count, and sets the state flag equal to 1 (step 236). The algorithm 200 sets the state flag to I and moves the multi-port switch/selector to the I-arm for the next iteration which provides monitor and control of the I-leg.

Advantageously, the present invention provides modulator bias control with a single monitoring photo-diode. For example, typical modulators, such as LiNbO$_3$ (lithium niobate) crystal Mach-Zehnder (MZ) modulators, can include a single integrated monitor photo-diode. The mechanisms presented herein allow modulator bias control without requiring external photo-diodes for monitoring all the bias ports. This minimizes hardware circuitry, board space, and power as well as reducing overall complexity by implement bias control in a single algorithm.

Those of ordinary skill in the art will recognize the systems and methods presented herein can equally apply to other control mechanisms associated with modulation systems. For example, the time-slot mechanisms can be utilized to control phase alignments with one photo-diode. Here, different time-slots can be assigned for phase adjustments associated with I and Q data and for phase adjustments associated with a carver and phase modulators. Additionally, the mechanisms presented herein can also apply to amplitude modulation in addition to phase modulation.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A differential quadrature phase shift keying (DQPSK) modulation system, comprising:
   a DQPSK modulator comprising an I-arm modulator, a Q-arm modulator, a phase modulator, and a splitter at an output of the DQPSK modulator;
   a photo-detector connected to the splitter; and
   a monitor and control circuit connected to the photo-detector, wherein the monitor and control circuit is configured to selectively insert a dither tone and control bias on each of the I-arm modulator, the Q-arm modulator, and the phase modulator, and wherein the bias control is responsive to monitoring the photo-detector.

2. The DQPSK modulation system of claim 1, wherein the monitor and control circuit comprises a dither clock configured to generate a dither tone signal, and wherein the dither clock is configured to selectively insert the dither tone signal at different predetermined times into each of the I-arm modulator, the Q-arm modulator, and the phase modulator.

3. The DQPSK modulation system of claim 2, wherein the monitor and control circuit comprises a microprocessor, and wherein the microprocessor is configured to:
   receive measurements of an output signal from the DQPSK modulator;
   calculate an error between the measurements and a target value; and
   adjust bias on one of the I-arm modulator, the Q-arm modulator, and the phase modulator responsive to the error.

4. The DQPSK modulation system of claim 3, wherein the dither clock is connected to a multi-port switch/selector connected to both the I-arm modulator and the Q-arm modulator, and wherein the multi-port switch/selector is configured to selectively connect the dither clock separately to each of the I-arm modulator and the Q-arm modulator for a pre-determined time period.

5. The DQPSK modulation system of claim 4, wherein the adjust bias is done on one of the I-arm modulator, the Q-arm modulator, and the phase modulator corresponding to the setting of the multi-port switch/selector.

6. The DQPSK modulation system of claim 4, wherein the monitor and control circuit further comprises:
   an amplifier connected to the photo-detector;
   an analog-to-digital converter connected to the amplifier; and
   the microprocessor connected to the analog-to-digital converter, a first digital-to-analog converter, a second digital-to-analog converter, and a third digital-to-analog converter;
   wherein the first digital-to-analog converter connects to the I-arm modulator, the second digital-to-analog converter connects to the Q-arm modulator, and the third digital-to-analog converter connects to the phase modulator; and
   wherein the microprocessor is configured to adjust bias by changing values provided to each of the first digital-to-analog converter, the second digital-to-analog converter, and the third digital-to-analog converter.

7. The DQPSK modulation system of claim 3, wherein the dither clock is connected to a multi-port switch/selector connected to a driver connect to the I-arm modulator and a driver connected to the Q-arm modulator, and wherein the multi-port switch/selector is configured to selectively connect the dither clock separately to each of the I-arm modulator and the Q-arm modulator for a pre-determined time period.

8. The DQPSK modulation system of claim 1, wherein the monitor and control circuit is configured to sequentially adjust bias on each of the I-arm modulator, the Q-arm modulator, and the phase modulator utilizing a single dither tone signal selectively inserted into each of the I-arm modulator, the Q-arm modulator, and the phase modulator at different times slots and adjusting bias based on which time slot is currently monitored at the photo-detector.

9. The DQPSK modulation system of claim 1, wherein bias on the I-arm modulator and the Q-arm modulator is set for null point and bias on the phase modulator is set for quadrature point.

10. A modulator bias control method, comprising:
    selectively inserting a dither tone signal into one of an I-arm modulator, a Q-arm modulator, and a phase modulator, wherein the I-arm modulator, the Q-arm modulator, and the phase modulator comprise a DQPSK modulator, and wherein the dither tone is selectively inserted into each of the I-arm modulator, the Q-arm modulator, and the phase modulator for separate pre-determined time periods;
    monitoring the dither tone at an output of the DQPSK modulator with a single photo-detector; and
    adjusting bias on one of the I-arm modulator, the Q-arm modulator, and the phase modulator responsive to monitored error, wherein the bias is adjusted depending on which of the I-arm modulator, the Q-arm modulator, and the phase modulator is receiving the dither tone signal.

11. The modulator bias control method of claim 10, wherein at start-up, the selectively inserting, monitoring, and adjusting steps are performed for each of the I-arm modulator, the Q-arm modulator, and the phase modulator to provide proper bias settings, and wherein subsequently the selectively inserting, monitoring, and adjusting steps are performed for continuing correction.

12. The modulator bias control method of claim 10, wherein the dither tone signal is generated by a dither clock connected to each of the I-arm modulator, the Q-arm modulator, and the phase modulator, and wherein the dither clock is configured to insert the dither tone signal separately into each of the I-arm modulator, the Q-arm modulator, and the phase modulator for the separate pre-determined time periods.

13. The modulator bias control method of claim 10, wherein bias on the I-arm modulator and the Q-arm modulator is set for null point and bias on the phase modulator is set for quadrature point.

14. The modulator bias control method of claim 10, wherein the adjusting bias step is performed only if the monitored error exceeds a threshold.

15. The modulator bias control method of claim 10, wherein the modulator bias control method is configured to sequentially adjust bias on each of the I-arm modulator, the Q-arm modulator, and the phase modulator utilizing a single dither tone signal selectively inserted into each of the I-arm modulator, the Q-arm modulator, and the phase modulator at different times slots and adjusting bias based on which time slot is currently monitored at the photo-detector.

16. An adjustment system for a modulator, comprising:
a dither tone signal generation system configured to generate a dither tone signal;
means for selectively inserting the dither tone signal into one of a plurality of modulators for a set time period;
a monitoring photo-detector at an output of the modulator; and
an error correction system configured to adjust bias on one of the plurality of modulators responsive to monitoring the dither tone signal at the output of the modulator.

17. The adjustment system for a modulator of claim 16, wherein the modulator comprises a DQPSK modulator, and the plurality of modulators comprise an I-arm modulator, a Q-arm modulator, and a phase modulator.

18. The adjustment system for a modulator of claim 16, wherein the error correction system is configured to sequentially adjust bias on each of the plurality of modulators utilizing a single dither tone signal selectively inserted into each of the plurality of modulators utilizing at different times slots and adjusting bias based on which time slot is currently monitored at the photo-detector.

* * * * *